United States Patent
Corder

(10) Patent No.: US 10,668,977 B2
(45) Date of Patent: Jun. 2, 2020

(54) BICYCLE PEDAL FOR MAXIMIZING AND STORING TORQUE

(71) Applicant: John Daniel Corder, Upland, CA (US)

(72) Inventor: John Daniel Corder, Upland, CA (US)

( * ) Notice: Subject to any disclaimer, the term of this patent is extended or adjusted under 35 U.S.C. 154(b) by 0 days.

(21) Appl. No.: 16/554,256

(22) Filed: Aug. 28, 2019

(65) Prior Publication Data

US 2020/0070932 A1    Mar. 5, 2020

Related U.S. Application Data

(63) Continuation-in-part of application No. 29/676,949, filed on Jan. 16, 2019.

(60) Provisional application No. 62/724,432, filed on Aug. 29, 2018.

(51) Int. Cl.
| | |
|---|---|
| *B62M 1/10* | (2010.01) |
| *F03G 1/08* | (2006.01) |
| *B62M 3/08* | (2006.01) |

(52) U.S. Cl.
CPC ............... *B62M 1/10* (2013.01); *B62M 3/08* (2013.01); *F03G 1/08* (2013.01); *F03G 2730/03* (2013.01)

(58) Field of Classification Search
CPC ... B62M 3/08; B62M 1/10; F03G 1/08; F03G 2730/03
See application file for complete search history.

(56) References Cited

U.S. PATENT DOCUMENTS

| | | | |
|---|---|---|---|
| 2,908,356 A | 10/1959 | Daarud | |
| 5,035,678 A | 7/1991 | Hageman | |
| 6,244,135 B1 * | 6/2001 | Merritt | B62M 1/10 |
| | | | 74/594.1 |
| 6,557,877 B2 * | 5/2003 | Dunkley | B60T 1/10 |
| | | | 280/215 |
| 8,251,389 B2 * | 8/2012 | Juan | B62M 23/02 |
| | | | 180/205.1 |
| 8,840,127 B2 | 9/2014 | Musgrove | |

FOREIGN PATENT DOCUMENTS

| | | | | |
|---|---|---|---|---|
| GB | 191114888 A | * | 11/1911 | ............. B62M 1/10 |
| WO | WO2016193792 A1 | | 12/2016 | |

* cited by examiner

*Primary Examiner* — Thomas C Diaz

(57) ABSTRACT

A bike pedal assembly uses a pawl, a gear and a torque spring to enable a rider to store and release torque energy while pedaling a bike. The pawl and gear are connected to a nut on an axle, which is connected to a crank arm of the bike. Being connected to the gear and a foot pedal, the torque spring stores torsional energy when one end is stationary and the other rotates with the foot pedal during half of the crank arm resolution, while releases torsional energy during the second half to the crank arm. Thus, the pedal assembly, which can be efficiently installed on each of the foot pedals of the bike, allows the rider to store and utilize additional torque energy and provides a more efficient means of storing torque energy than the conventional system.

12 Claims, 15 Drawing Sheets

BICYCLE PEDAL FOR MAXIMIZING AND STORING TORQUE

The current application claims a priority to the U.S. Provisional Patent application Ser. No. 62/724,432 filed on Aug. 29, 2018.

FIELD OF THE INVENTION

The present invention relates generally to bicycle pedals. More specifically, the present invention relates to a bicycle pedal assembly that can store, release, and maximize torque along the foot pedal.

BACKGROUND OF THE INVENTION

A bicycle can get a rider places quickly without gobbling fossil fuels like gasoline, diesel, and coal or creating pollution. Bicycles can do so by efficiently converting the power a rider produces into kinetic energy (energy of movement). Normally, bicycles include a drive chain system wherein the rider can rotate a crankshaft by applying force against a pair of pedals connected to crank arms with the rider's feet. The drive chain system of a bicycle typically includes a forward sprocket, or chainring, attached to the crankshaft, and a rear sprocket, or cog, linked to the forward sprocket by a tension chain. Opposing crank arms perpendicularly attach to and extend from opposite sides of the forward sprocket, and pedals are pivotally attached to each crank arm end. When the rider pedals, the forward sprocket rotates in a unidirectional angular direction. As the forward sprocket rotates, the tension chain causes the rear sprocket to turn, which is connected to the rear wheel and thus drives the bicycle to move forward.

The bicycle is a tremendously efficient means of transportation. In fact, cycling is more efficient than any other method of travel—including walking. The development of drive chain system helped make the modern-day bicycle possible. With the advent of gears, the rider can pedal efficiently, enjoying increased speed and easy riding up steep grades. Torque is what makes the wheels on the bicycle go around. A great deal of research has been done to determine how to increase the torque applied by the rider to the rear wheel, while decreasing the torque required to make the wheels on the bicycle turn. The torque produced by the drive chain system is dependent upon the size of the chain ring being used, and the size of the rear sprocket being used. When the chain is on the smaller chain ring, the force applied through the chain is greater because the chain ring is closer to the axis of rotation and applies a larger force to equal the torque produced by the pedals.

Generally, efficiency is lost through the rotatory motion of the rider's foot movements as the foot presses upon the pedal and crank assembly at various stages of the rotary cycle. The maximum leverage—thus torque, is achieved by a foot when the pedal crank is at the forward horizontal position. Thus, in each rotary cycle there are two points in a full rotation of the crankshaft when the leverage imparted to the pedal crank is maximum. Conversely, in each rotary cycle there are two points when the leverage imparted to the pedal crank from the rider's foot is zero. These points of minimum leverage are developed when the pedal crank is at the vertical position. The momentum of the bicycle carries the pedal crank into the forward horizontal position where leverage can again be exerted.

There have been many attempts to improve the efficiency of a bicycle's operation. One specific focus has been to improve the torque generated by the rider's pedaling force in order to effectuate an increased speed, reduce the rider's fatigue, especially when the rider is traversing steep hills, and/or long rides when constant pedaling is required. It is well known that by increasing the length of the crank arms, i.e. the distance between the point of force application, i.e. the pedal, and the crank shaft, or bottom bracket, a greater force may be applied to the forward sprocket or chain ring. As a result, more torque can be applied to the rear wheel. However, because conventional bicycle drive chain system requires a rider's legs to move around in a complete revolution, the possible crank arm length is limited by the rider's anatomy and clearance with the ground. Using the conventional design, when the crank arm length is extended beyond a certain distance, it becomes uncomfortable or even impossible for the rider to make a complete turn of the crank arms while positioned on the bicycle. Further, at the extremes of aerodynamic positioning, when the crank arm rotates to the top of the pedal stroke, the hip of the rider is overly flexed. This places the rider's leg in a position where it is hard to apply force to the crank; as a result, producing power becomes more difficult. The longer the crank arm, the more difficult it becomes. So, in recent years, many riders have gravitated to shorter crank lengths, to reduce the amount of hip flexion as the crank passes over dead center vertical positions. Additionally, a longer crank arm can cause a pedal strike in tight corners. Further, many of the existing mechanisms for increasing energy into a drive chain system normally relate to the improvements and modifications of the cranks, forward sprocket, chain, and gears, etc., thus, have the disadvantage of not being easily adaptable to an ordinary bicycle and likewise not easily maintained by the rider.

In conventional systems, mechanical means of storing torque energy along the bicycle sprocket allows the rider to use this stored energy along the bicycle sprocket for the discussed applications. These conventional systems, however, require extensive modification to the bicycle. The present invention aims to improve the conventional systems by allocating the torque storing mechanism along the foot pedals. Thus, the present invention can be easily incorporated along the bicycle pedals with little to no altercations of the original bicycle sprocket assembly. Additionally, the present invention, when installed on each of the foot pedals, allows the rider to store and utilize additional torque energy and provides a more efficient means of storing torque energy than the conventional system.

SUMMARY OF THE INVENTION

A bike pedal assembly is used to store torsional energy along a foot pedal and release the stored energy through a crank arm of the bike to significantly improve the efficiency and effectiveness of the pealing cycle when a rider uses the bike. The bike pedal assembly includes an axle, a nut, a pawl, a gear and a torque spring to enable the rider to store and release torque energy while pedaling the bike.

Through the nut and axle, the pedal assembly is connected to the crank arm of the bike. The pawl and gear are connected to the nut and the pawl can unidirectionally lock the gear from rotating around the axle. The torque spring is connected to the gear on one end and the foot pedal on the other. During the first half of a resolution of the crank arm when the rider is pedaling from a bottom lowest position of the pedal to the highest position, the torque spring stores torsional energy with the end affixed to the gear being stationary and the other affixed to the foot pedal rotating with the foot pedal.

During the second half of the crank arm resolution, the torque spring releases torsional energy to the crank arm as the end affixed to the gear is rotating and pushing the crank arm with the stored energy. Thus, through the torque spring, the pedal assembly enables the rider to store and utilize additional torque energy when pedaling. The pedal assembly provides a more efficient and effective means of storing and releasing torque energy than most conventional systems.

DETAIL DESCRIPTIONS OF THE INVENTION

All illustrations of the drawings are for the purpose of describing selected versions of the present invention and are not intended to limit the scope of the present invention.

Figure 1:
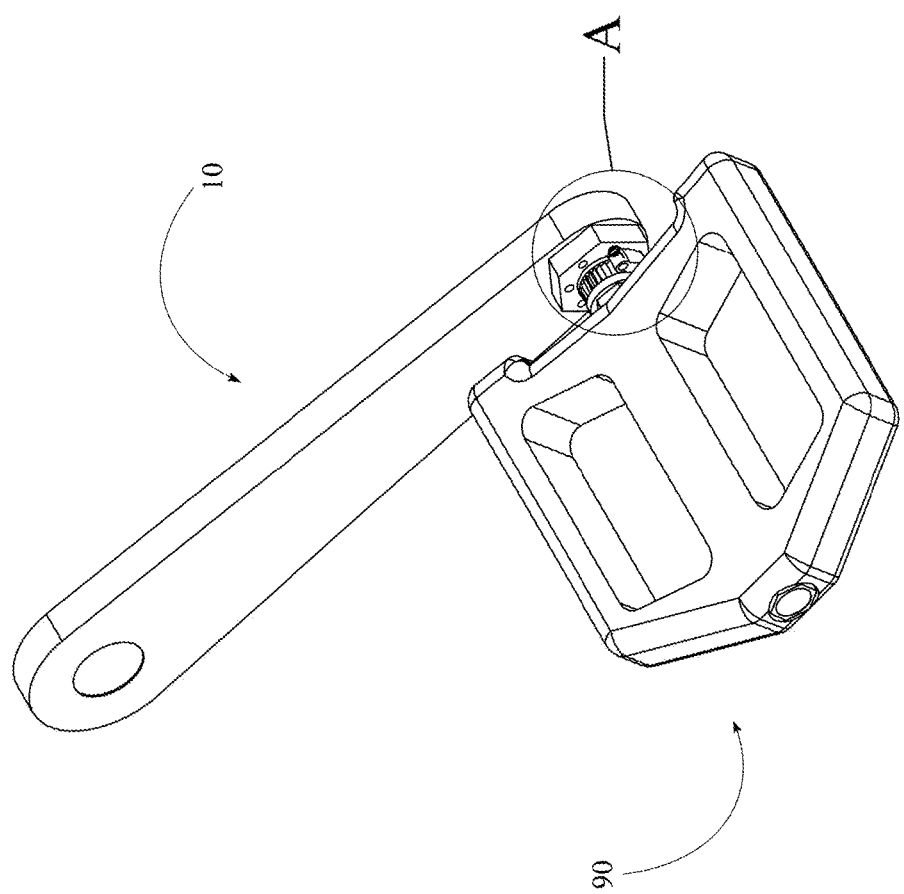
FIG. 1 is a perspective view of the present invention indicating the sectional view A.
Figure 2:
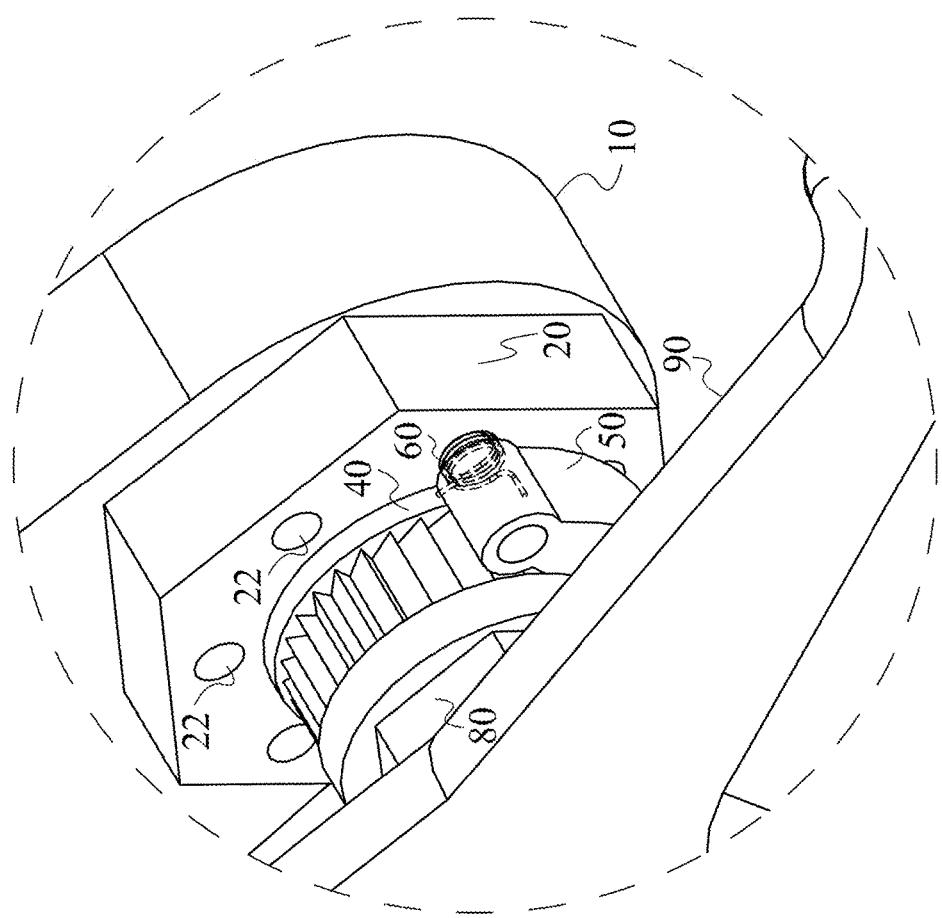
FIG. 2 is a magnified view of section A in FIG. 1 of the present invention.
Figure 3:
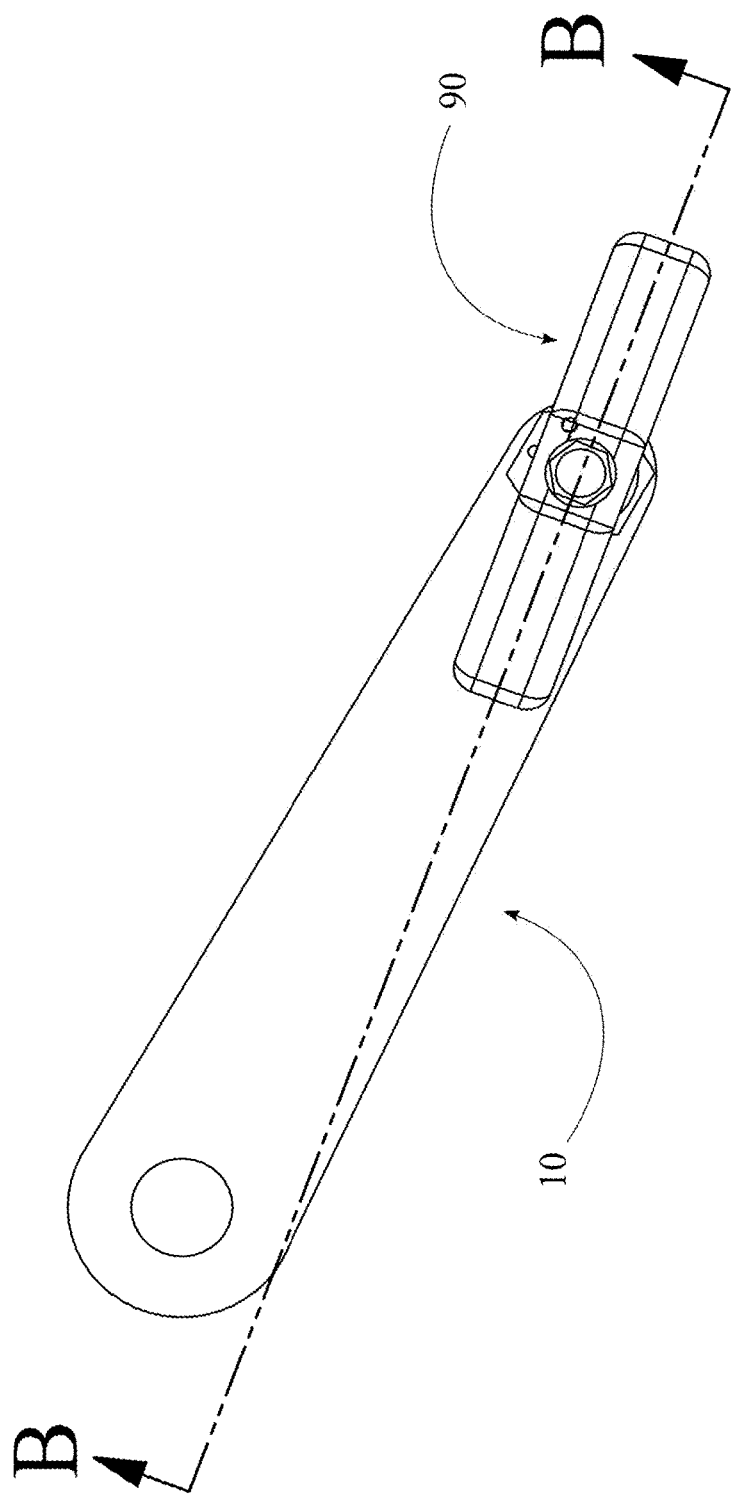
FIG. 3 is a left side view of the present invention indicating the direction of section cut B.
Figure 4:
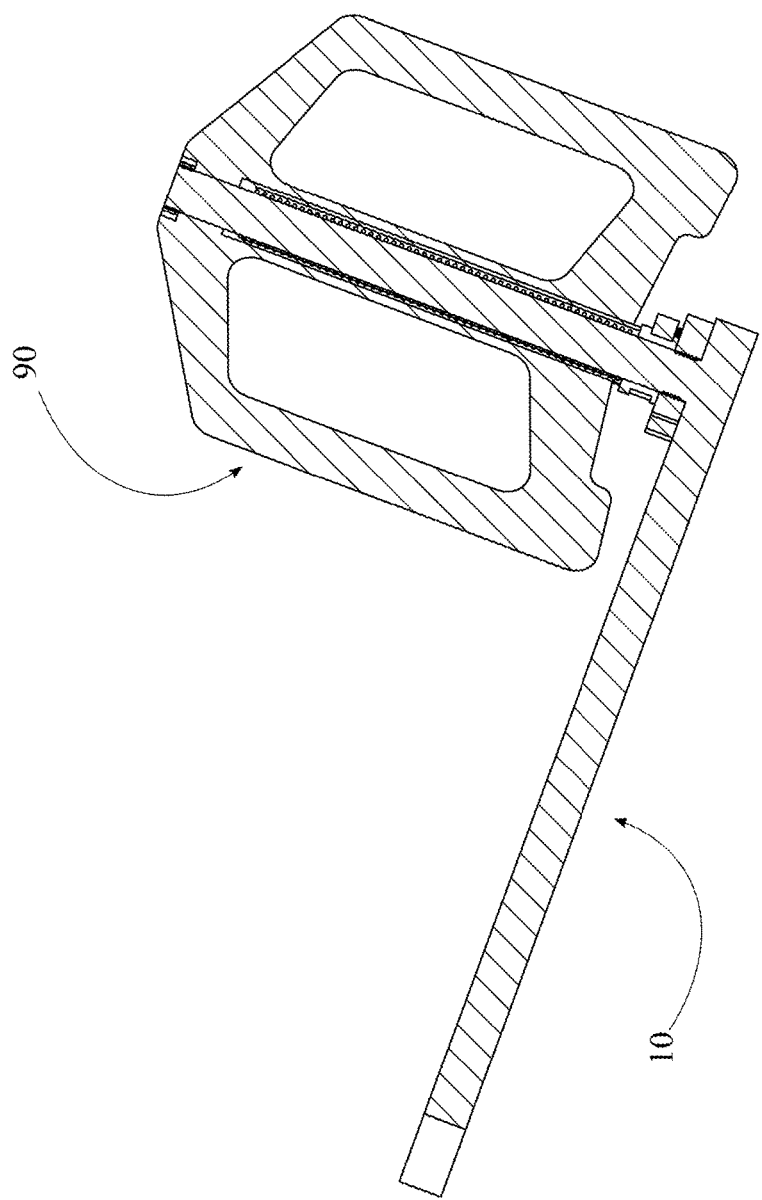
FIG. 4 is a cross sectional view of the present invention, taken along the cutting lines B-B in FIG. 3.

As can be seen in FIG. 1 to FIG. 5, the present invention comprises a bike pedal assembly that is installed on to a corresponding bicycle crank arm. More specifically, the bike pedal assembly of the present invention allows a rider to wind-up and store reserved torque along the bike pedal assembly, thus allowing the rider to maximize the torque output, to traverse steeper and/or rougher terrain easier, and to reduce the fatigue of the rider. The bike pedal assembly comprises a crank arm 10, an axle 12, a nut 20, a gear 40, a pawl 50, a torque spring 70, and a foot pedal 90. More specifically, the crank arm 10 serves as the main mounting platform of the present invention, housing the driving components along the end of the crank arm 10 to the foot pedal 90. The crank arm 10 transfers the stored torsional energy of the pedal assembly to the bicycle sprocket. The axle 12 projects away from the crank arm 10. More specifically, the axle 12 serves as a mounting platform, specifically housing the driving components of the pedal assembly. The axle 12 is terminally connected to the crank arm 10 of a bike, and the nut 20 is concentrically mounted to the axle 12 adjacent the crank arm 10. The nut 20 is used to firmly hold the axle 12 to the crank arm 10 when attached to the axle 12 against the crank arm 10, as seen in FIG. 1 to FIG. 2, and FIG. 4. The gear 40 is concentrically and rotatably attached to the axle 12 adjacent the nut 20. The pawl 50 is perimetrically mounted to the nut adjacent the gear 40 and is configured to unidirectionally lock the gear 40 from rotating around the axle 12, thus the gear 40 can rotate with the axle 12 when locked by the pawl 50 and rotate around the axle when released by the pawl 50. The torque spring 70 is concentrically positioned on the axle 12 and is terminally and perimetrically attached to the gear 40. Additionally, the torque 70 is attached to the foot pedal 90, and the foot pedal 90 is rotatably and detachably attached to the axle 12. The torque 70 is being held by the gear 40 and the foot pedal 90, thus can rotate with pedal 90 while being held by the gear 40 to load with torque and rotate with the gear 40 while being held by the foot pedal 90 to release the stored energy to the assist the rider pedaling.

Figure 5:
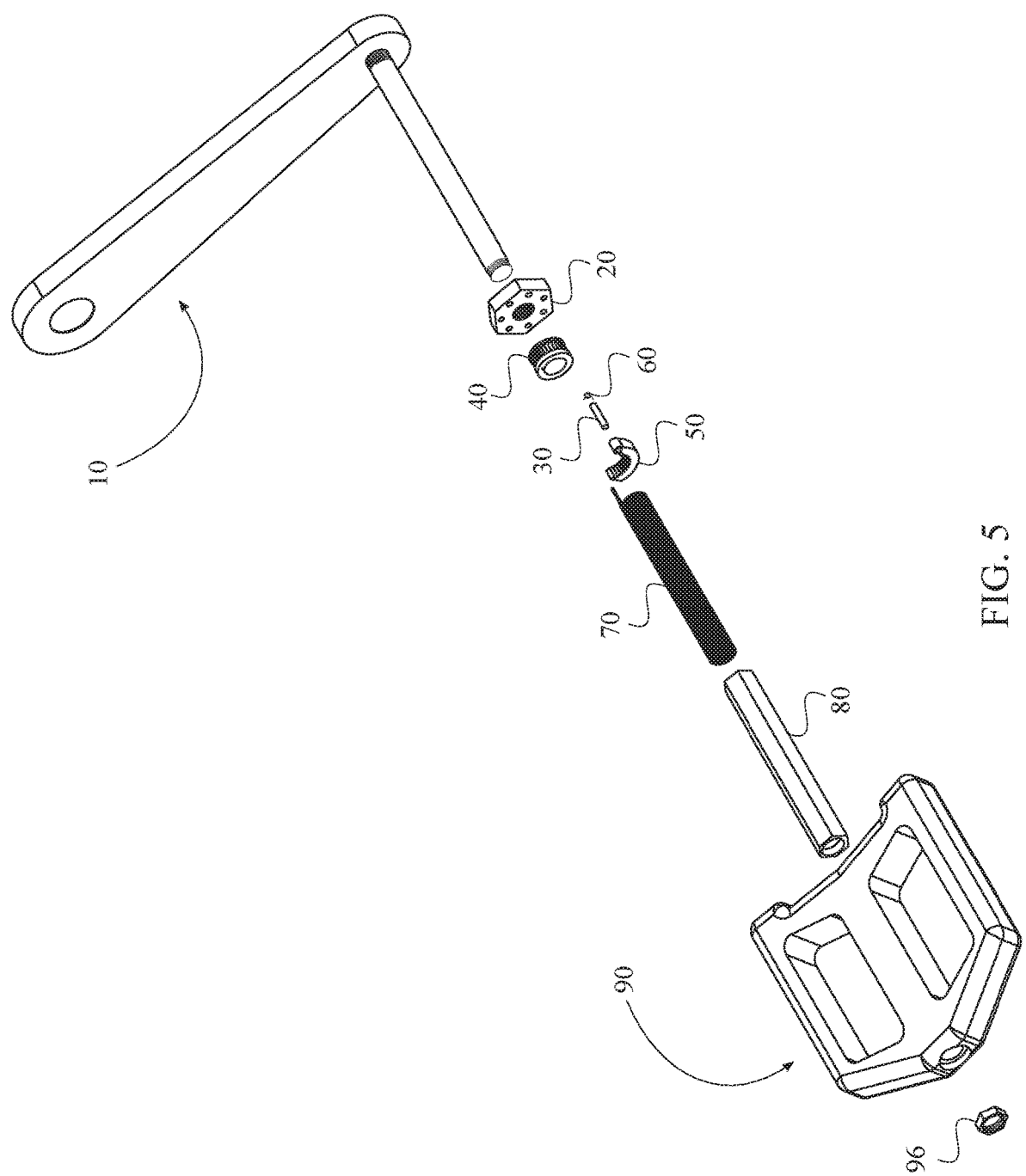
FIG. 5 is an exploded view of the present invention.
Figure 6:
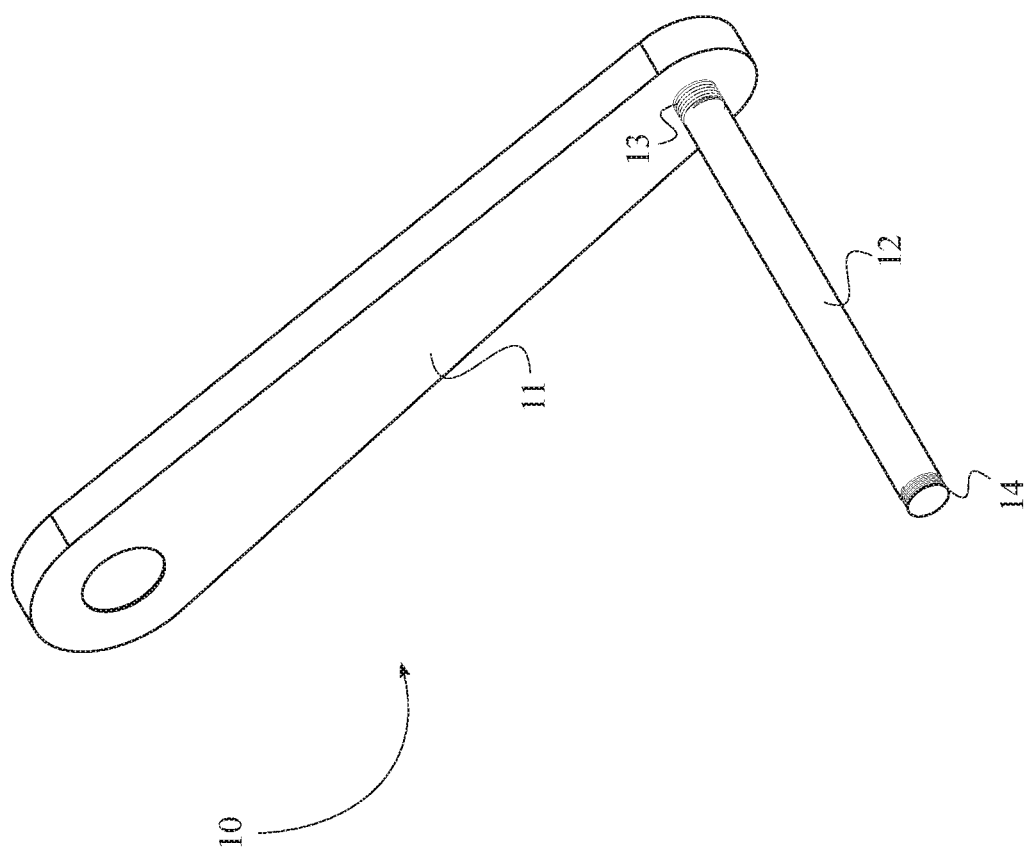
FIG. 6 is a perspective view of an axle connected to a crank arm of the present invention.
Figure 7:
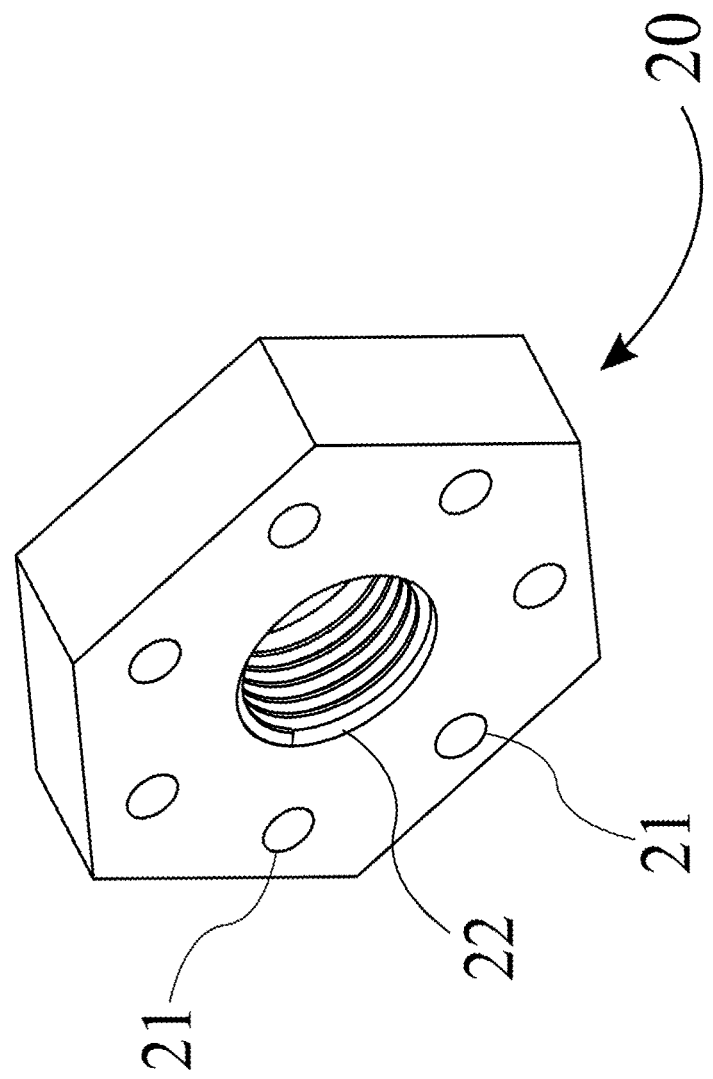
FIG. 7 is a perspective view of a nut used in the present invention.
Figure 8:
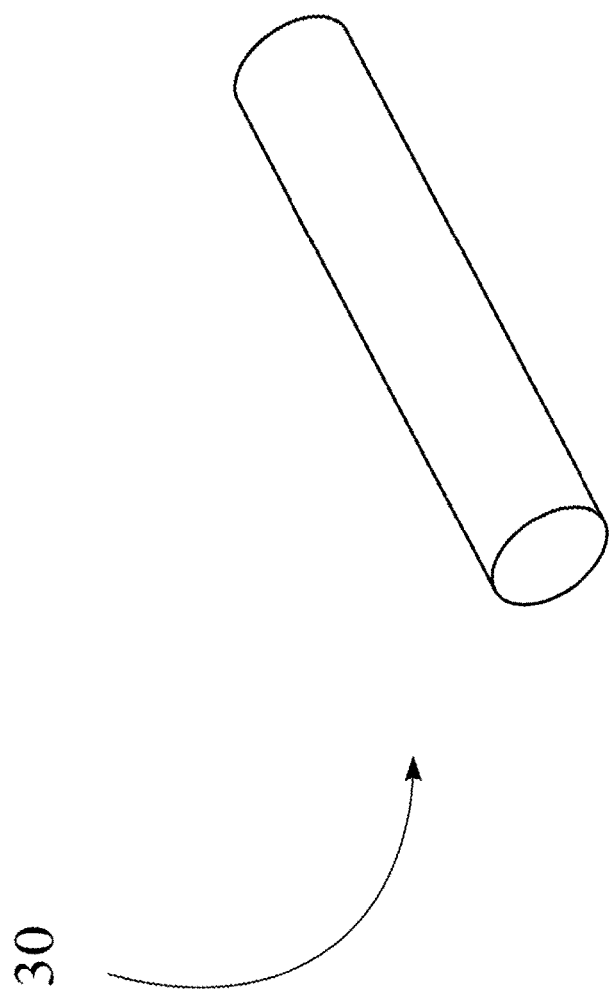
FIG. 8 is a perspective view of a pin used in the present invention.

As can be seen in FIG. 5 to FIG. 7, the axle 12 comprises a first threaded end 13 that resides on the axle 12 adjacent the crank arm 11. More specifically, the axle 12 is mounted to the crank arm 10 through the first threaded end 13, which also serves as a mounting member to secure the nut 20 on to the crank arm 10. The nut comprises a center threaded hole 22 that is concentrically connected to the first threaded end 13 of the axle 12 adjacent the crank arm 10. The nut 20 serves as the fixed rotational member of the pedal assembly that further mounts the driving components.

Figure 9:
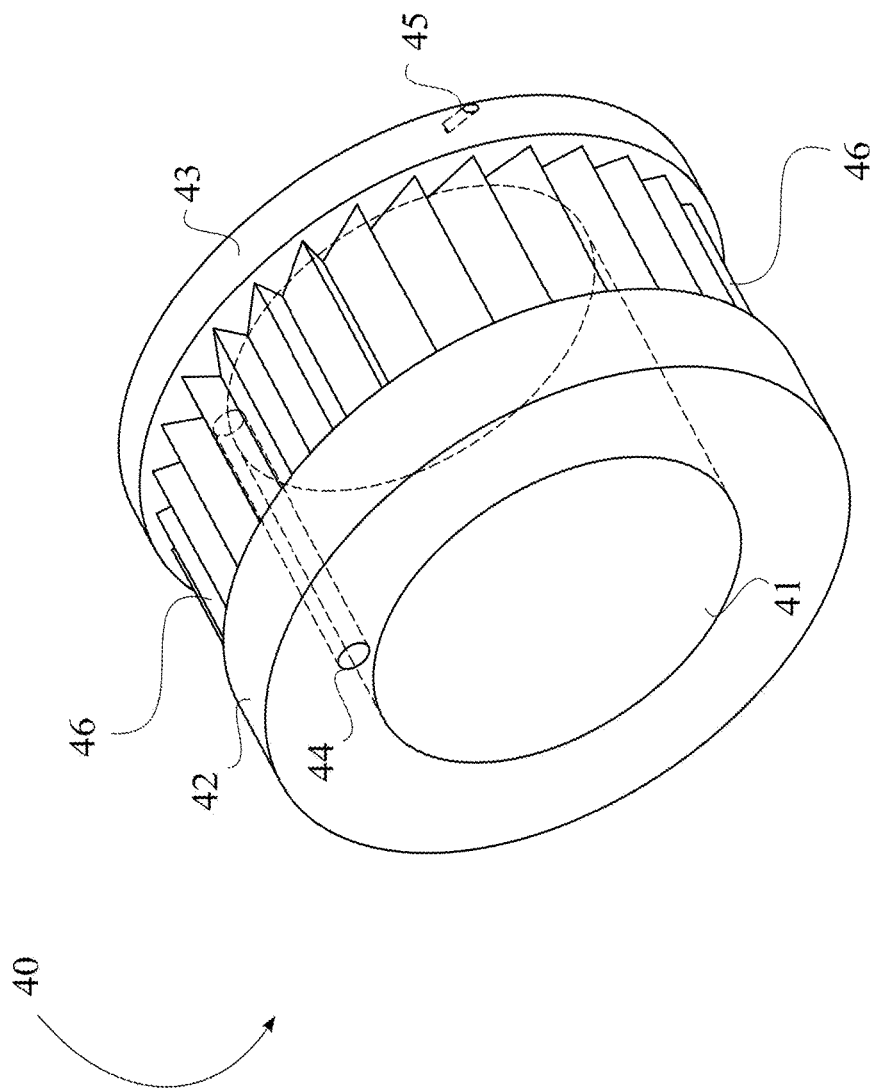
FIG. 9 is a perspective view of a gear used in the present invention.

As can be seen in FIG. 5 and FIG. 8 to FIG. 11, the bike pedal assembly comprises a locking spring 60 and a pin 30. The gear 40 comprises a bushing 41, a plurality of gear teeth 46, a rim hole 44, and a gear pin hole 45. The bushing 41 is concentrically and rotatably connected to the axle 12 adjacent the nut 20. More specifically, the bushing 41 serves as an alignment opening that allows the gear 40 to freely rotate around the axle 12. The plurality of gear teeth 46 is exteriorly distributed along the cylindrical surface of the gear 40. Additionally, the plurality of gear teeth 46 lines the perimeter profile of the gear 40. More specifically, the plurality of gear teeth 46 takes form of one-directional gear tooth that allows the gear 40 to store torsional energy when the crank arm 10 is wound backwards, working in conjunction with the pawl 50 and the torque spring 70. The rim hole 44 is positioned perpendicular to the cylindrical surface of the gear 40 adjacent the plurality of gear teeth 46. The rim hole 44 is used to hold one end of the locking spring 60, which connects to the pawl 50 on the other end. The gear pin hole 45 is positioned outside and parallel with the bushing 41, opposite the nut 20. Additionally, the gear pin hole 45 is offset from the bushing 41. More specifically, the gear pin hole 45 serves as an anchor opening for the torque spring 70. As can be seen in FIG. 9, the pawl 50 is installed on the pin 30, pivotally attached on to the nut 10. Additionally, the pawl 50 is positioned along the gear 40, such that the pawl 50 meshes along the plurality of gear teeth 46. More specifically, the pawl 50 serves as an anti-reversal locking member that secures the gear 40 along the rotationally static profile of the nut 10 such that the pedal assembly can store torsional energy when the crank arm 10 is wound backwards. The pawl 50 comprises a loop 51, a loop pin hole 52, a pawl pin hole 53, a plurality of pawl teeth 55. More specifically, the loop 51 is terminally positioned on the pawl 50, and the loop pin hole 52 traverses the loop 51. The loop 51 is the terminal portion of the pawl 50 that pivotally mounts along the nut 20. Additionally, the loop pin hole 52 concentrically aligns the pin 30. More specifically, the loop pin hole 52 serves as the pivotal opening that secures the loop 51 on to the pin 30. Additionally, the pawl pin hole 53 is positioned adjacent to and parallel with the loop pin hole 52. Further, the pawl pin hole 53 is positioned on the nut 20 end of the pawl 50. More specifically, the pawl pin hole 53 serves as an anchor opening for the locking spring 60. The plurality of pawl teeth 55 is distributed across the pawl 50, adjacent the loop 51, and the plurality of pawl teeth 55 engages and unidirectionally locks the plurality of gear teeth 46 of the gear 40. More specifically, the plurality of pawl teeth 55 traverses the pawl 50 starting from the loop 51, specifically meshing with the plurality of gear teeth 46. Further, the plurality of pawl teeth 55 allows the gear 40 to freely rotate along the axle 12 when the crank arm 10 is wound back but fixes the gear 40 along the pawl 50 when the crank arm 10 is moved forward along the bicycle sprocket. The locking spring 60 is exteriorly and concentrically attached to the pin 30. Additionally, the locking spring 60 is connected to both the rim hole 44 of the gear 40 and the pawl pin hole 53 of the pawl 50. Thus, the locking spring 60 is installed between the pawl 50 and the nut 20 and concentrically aligns with the pin 30. Further, the locking spring 60 serves as a compressive member, pivoting the pawl 50 towards the gear 40, such that the plurality of gear teeth 46 and the plurality of pawl teeth 55 can mesh and engage properly. As can be seen in FIG. 7, the nut 20 comprises a plurality of radial holes 21, and the plurality of radial holes 21 is distally distributed on the nut 20. Each of the plurality of radial holes 21 traverses the perimeter profile of the nut 20. More specifically, each of the plurality of radial holes 21 serves as a connection opening such that any of the plurality of radial holes 21 can accept the pin 30. As can be seen in FIG. 5, The pin 30 is mounted on the nut 20 through one of the plurality of radial holes 21 and the pin 30 engages the loop pin hole 52 of the pawl 50. More specifically, the pin 30 resides on the plurality of radial holes 21, and projects towards the axle 12. More specifically, the pin 30 serves as a mounting platform to pivotally attach the pawl 50.

As can be seen in FIG. 9. the gear 40 of the present invention comprises a first rim 42 and a second rim 43. The first rim 42 is positioned on the gear 40 adjacent the nut 20. More specifically, the first rim 42 spaces out the gear 40, such that the gear 40 can freely rotate around the axle 12. The rim hole 44 is positioned perpendicular to the cylindrical surface of the first rim 42 and is positioned on the first rim 42 and perpendicular to the bushing 41. The second rim 43 is positioned on the gear 40 opposite the first rim 42. The gear pin hole 45 is positioned on the second rim 43, parallel with and outside the bushing 41. Additionally, the gear pin hole 45 partially traverses from the second rim 43 to the first rim 42. The plurality of gear teeth 46 is positioned between the first rim 42 and the second rim 43, and is oriented perpendicular to both the first rim 42 and second rim 43.

Figure 10:
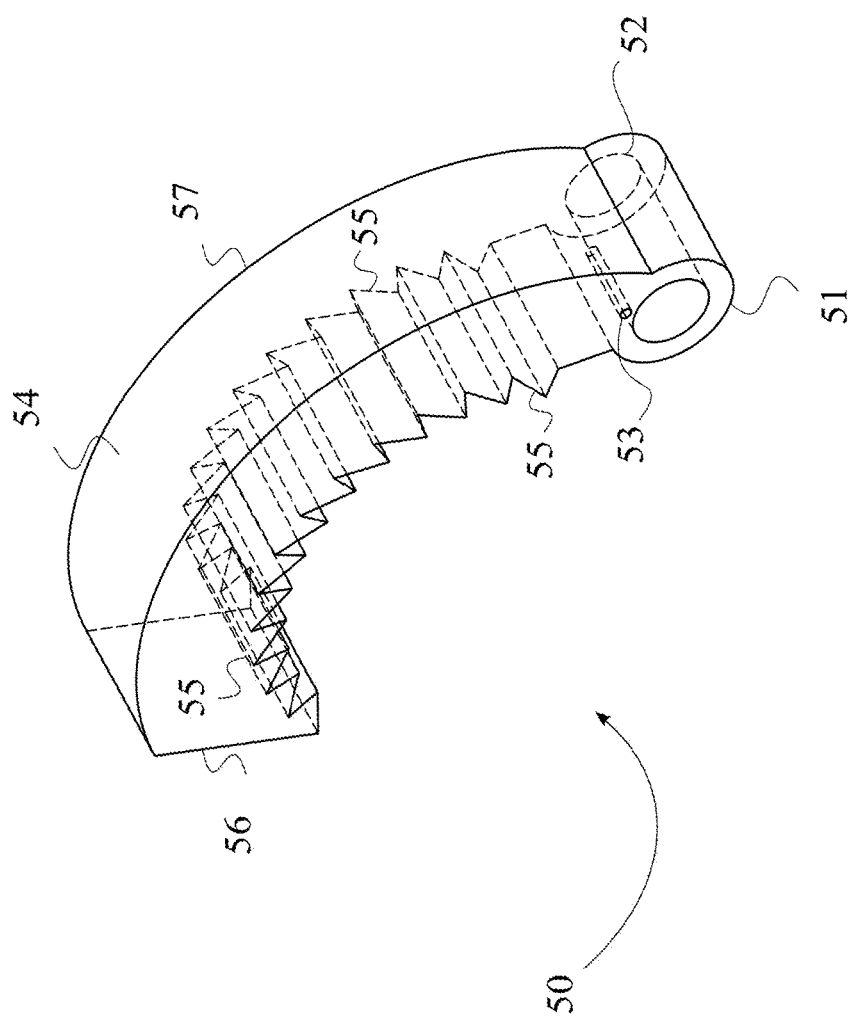
FIG. 10 is a perspective view of a pawl used in the present invention.

As can be seen in FIG. 10, the pawl 50 of the present invention comprises a first surface 57 and a second surface 56. More specifically, the first surface 57 is positioned on the pawl 50 adjacent the nut 20. The second surface 56 is poisoned parallel with and opposite the first surface 57. The loop pin hole 52 is oriented perpendicular to the first surface 57 and the second surface 56, and the pawl pin hole 53 is positioned on the first surface 57 adjacent the loop pin hole 52. Further, the pawl 50 comprises an arc 54 which traverses the exterior profile of the pawl 50. The loop 51 is terminally positioned on the arc 54 and the plurality of pawl teeth 56 is distributed across the concave surface of the arc 54. The arc 54 wraps around the perimeter profile of the pawl 50 and can lock the gear 40 to the nut 20 as seen in FIG. 10.

Figure 11:
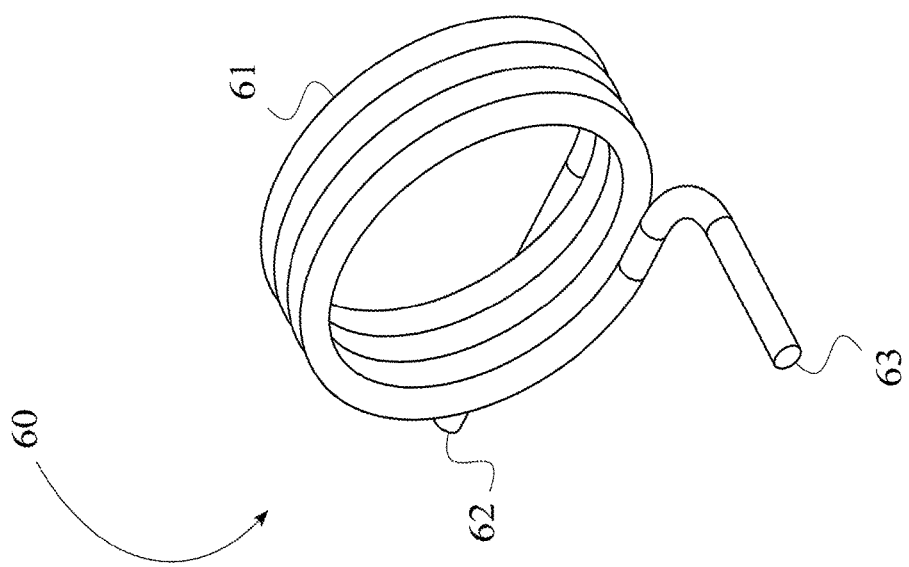
FIG. 11 is a perspective view of a locking spring used in the present invention.

As can be seen in FIG. 11, the locking spring 60 of the present invention comprises a locking spring coil 61, a first arm 62, and a second arm 63. More specifically, the first arm 62 is terminally positioned on the locking spring coil 61 and configured to engage the rim hole 44 of the gear 40. More specifically, the first arm 62 traverses from the locking spring coil 61 to the nut 20. The first arm 62 serves as an anchor member for the locking spring coil 61, such that locking spring coil 61 secures along the nut 20. The second arm 63 is terminally positioned on the locking spring coil 61 opposite the first arm 62, and the second arm 63 is configured to engage the pawl pin hole 53 of the pawl 50. Additionally, the second arm 63 traverses from the locking spring coil 61 to the pawl pin hole 53. More specifically, the second arm 63 directs the pawl 50 towards the gear 40, such that the pawl 50 engages the gear 40 properly, as seen in FIG. 5.

Figure 14:
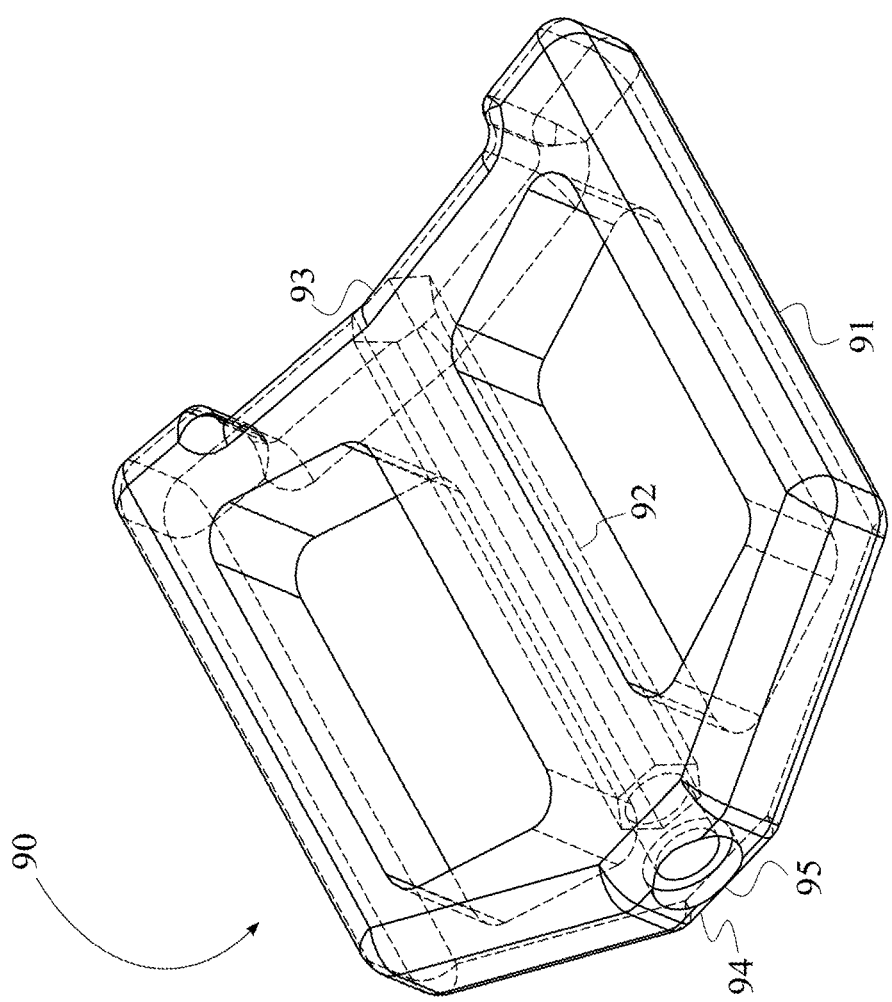
FIG. 14 is a perspective view of a foot pedal used in the present invention.
Figure 15:
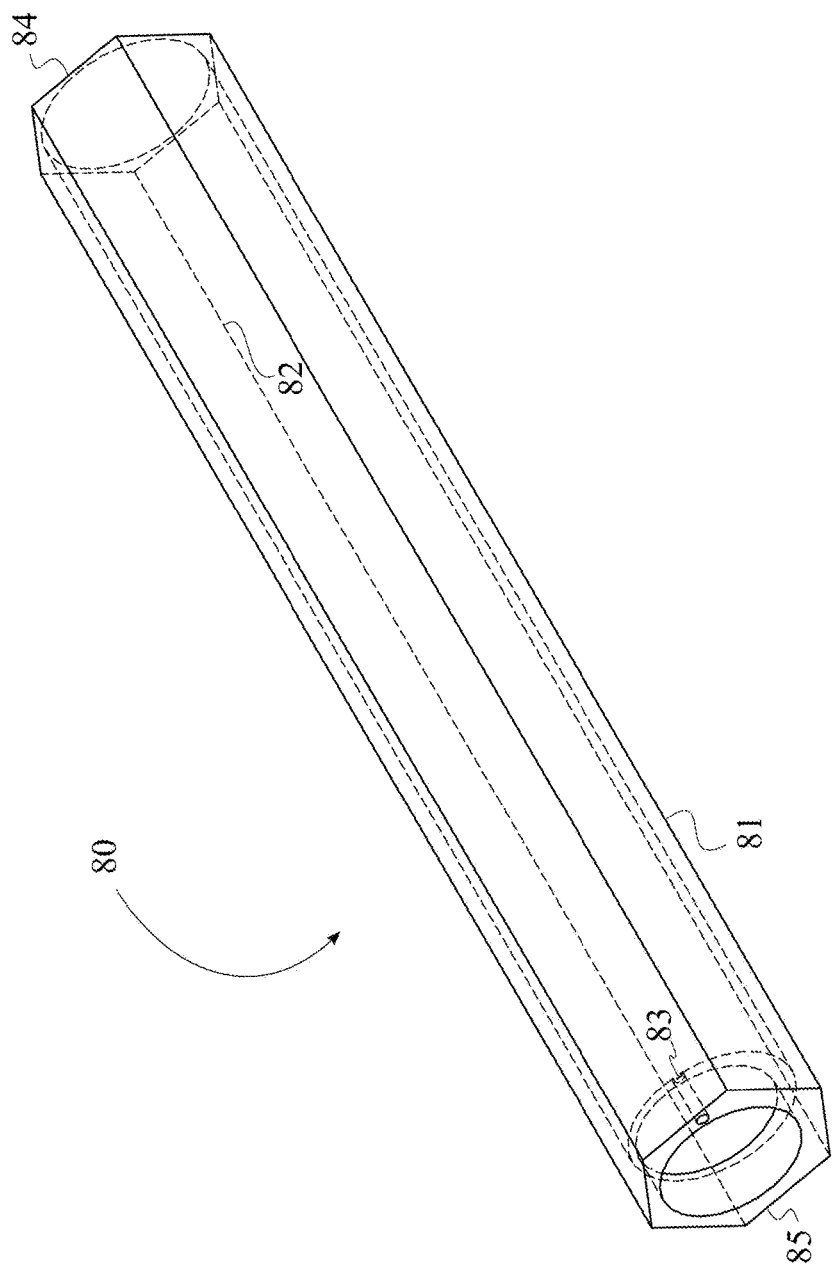
FIG. 15 is a perspective view of a coupling used in the present invention.

As can be seen in FIG. 14 to FIG. 15, the foot pedal 90 of the present invention comprises a bore 92, a coupling 80, and a chassis 91. The bore 92 is centrally and interiorly positioned on the chassis 91. The coupling 80 is concentrically aligned with the axle 12. Additionally, the coupling 80 encapsulates the torque spring 70. More specifically, the coupling 80 serves as the main mounting platform for the foot pedal 90. Additionally, the coupling 80 is freely rotational along the gear 40 when the crank arm 10 is moved forward along the sprocket of the bike. When the crank arm 10 is wound back, the coupling 80 remains freely rotational along the axle 12, winding the torque spring 70 along the gear 40, storing torsional energy along the torque spring 70. The coupling 80 comprises a sleeve 81, a channel 82, and a coupling pin hole 83. More specifically, the sleeve 81 is adapted to engage the bore 92 of the foot pedal 90. The sleeve 81 is the exterior portion of the coupling 80 that conforms and aligns with the foot pedal 90. More specifically, the sleeve 81 serves as the main mounting platform for securing the foot pedal 90 to the coupling 80. The channel 82 is interiorly and concentrically positioned on the sleeve 81. The channel 82 is the interior portion of the coupling 80 that concentrically aligns with the axle 12. More specifically, the channel 82 houses the torque spring 70. The coupling pin hole 83 is interiorly positioned on the sleeve 81, opposite the pawl 50 along the channel 82. The coupling pin hole 83 resides on the axle 12 portion of the pedal. Additionally, the coupling pin hole 83 of the coupling 80 concentrically aligns with the fourth arm 73 of the torque spring 70. More specifically, the coupling pin hole 83 serves as an anchor opening to secure the torque spring 70 along the coupling 80. The coupling 80 further comprises an open end 84 and a threaded open end 85. More specifically, the open end 84 is terminally positioned on the coupling 80 adjacent the gear 40. The threaded open end 85 is terminally positioned on the coupling 80 opposite the open end 84. The channel 82 traverses between the open end 84 and the threaded open end 85. The coupling pin hole 83 is interiorly positioned on the coupling 80 adjacent the threaded open end 85.

Figure 13:
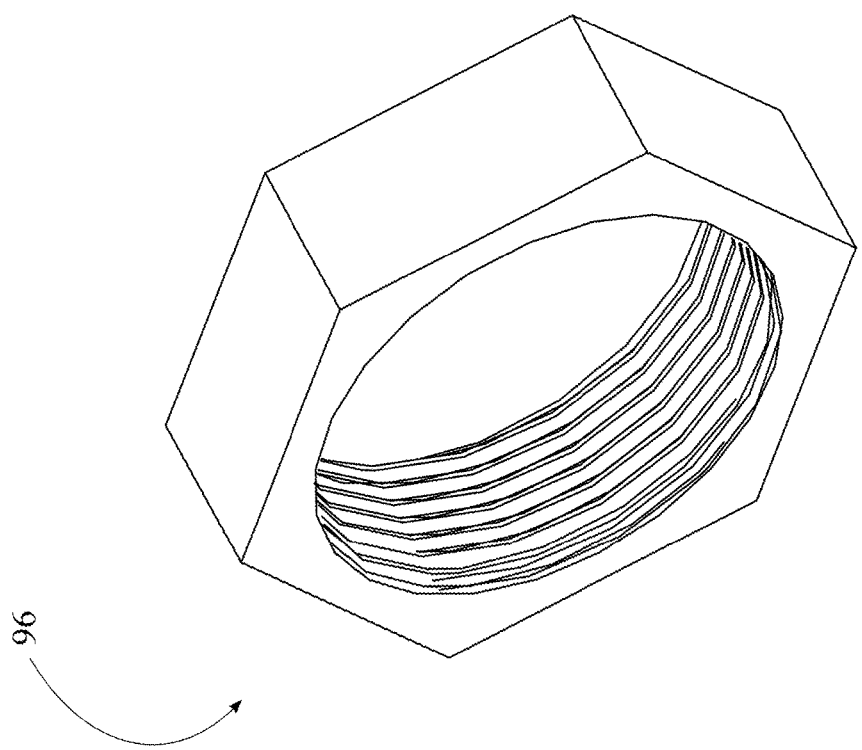
FIG. 13 is a perspective view of a pedal nut used in the present invention.

As can be seen in FIG. 4 to FIG. 6, and FIG. 13 to FIG. 15, the axle 12 of the present invention comprises a second threaded end 14. The second threaded end 14 is terminally positioned on the axle 12 opposite the first threaded end 13 as seen in FIG. 6. The axle 12 is interiorly and concentrically connected to the channel 82 of the coupling 80 of the foot pedal 90. The foot pedal 90 installs on the profile of the sleeve 81 of the coupling 80, traversing along the axle 12. Additionally, the foot pedal 90 is positioned adjacent to the gear 40 and the pawl 50 of the pedal assembly. More specifically, the foot pedal 90 serves as the foot platform for the pedal assembly. Additionally, the foot pedal 90 houses the platform, such that the coupling 80 rotates along the foot pedal 90. The chassis 91 of the foot pedal 90 spans the axle 12. More specifically, the chassis 91 serves as the main foot platform for the foot pedal 90, providing leverage for the rider to wind-up, and/or move the pedal assembly forward along the bicycle sprocket. As can be seen in FIG. 14, the bore 92 traverses through the chassis 91. Additionally, the bore concentrically aligns with the sleeve 81 portion of the coupling 80. Further, the bore 92 serves as an attachment means in securing the foot pedal 90 along the coupling 80. As can be seen in FIG. 13 to FIG. 14, the foot pedal 90 further comprises a pedal nut 96 and a cap hole 95. More specifically, the cap hole 95 is terminally positioned on the chassis 91 of the foot pedal 90 and concentrically aligned with the channel 82 of the coupling 80. Additionally, the pedal nut 96 is concentrically and terminally connected to the second threaded end 14 of the axle 12 through the cap hole 95 and against the chassis 91 of the foot pedal 90.

Figure 12:
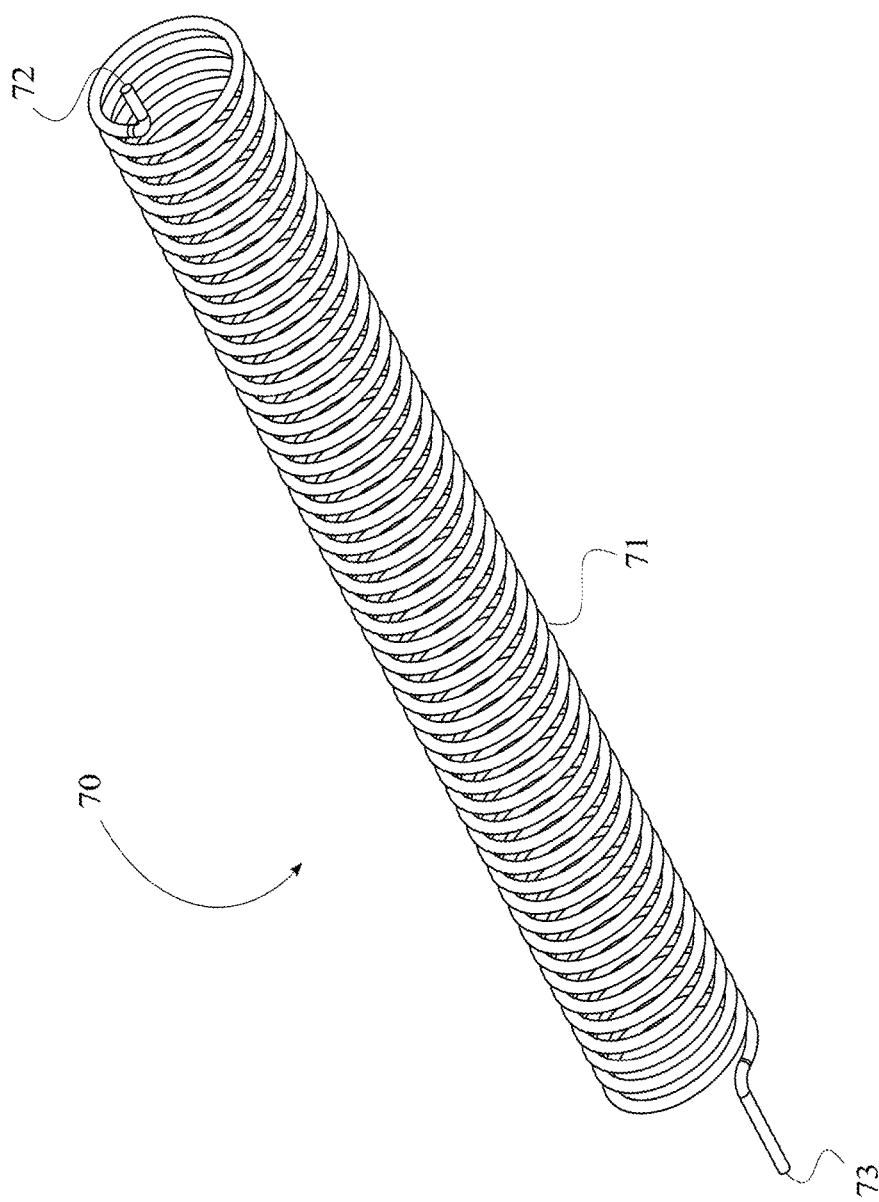
FIG. 12 is a perspective view of a torque spring used in the present invention.

As can be seen in FIG. 5 and FIG. 12, the torque spring 70 of the present invention serves as the main torsional driver component of the pedal assembly that allows the rider to store wound torsional energy along the crank arm 10. The torque spring 70 comprises a torque spring coil 71, a third arm 72 and a fourth arm 73. More specifically, the torque spring coil 71 traverses from the gear 40 to the inside of the channel 82 of the coupling 80. More specifically, the torque spring coil 71 is the main body of the torque spring 70 that secures along the axle 12. The third arm 72 is terminally positioned on the torque spring coil 71 and configured to engage the gear pin hole 45 of the gear 40. The third arm 72 bridges the torque spring 70 on to the gear 40. Additionally, the fourth arm 73 is terminally positioned on the torque spring coil 71 opposite the gear 73 along the torque spring coil 71 and is configured to engage the coupling pin hole 83 of the coupling 80 as seen in FIG. 5. The fourth arm 73 is positioned along the axle 12 end of the torque spring 70, opposite to the third arm 72. More specifically, the fourth arm 73 serves as an anchor member to bridge the coupling 80 on to the torque spring 70.

To use the present invention, the rider first disassembles a pedal from one side of the crank assembly of a rider's bike after acquiring a bike pedal assembly of the present invention. The rider then removes the existing axle of the petal from the crank arm 10 or keeps existing axle on the bike if determined to be suitable for use with the present invention. Holding the pedal assembly, the rider can install the present invention to the crank arm 10 by mounting the first threaded end 13 of the axle 12 to the crank arm 10 of the bike. Subsequently, the rider tightens the present invention onto the bike by tightening the nut 20 on the axle 12 against the crank arm 10.

With the pedal assembly of the present invention installed on the crank arm 10 of each side of the bike, the rider can efficiently and effectively store torsional energy in the torque spring 70 of the pedal assembly and utilize the released energy from the pedal assembly to the crank arm 10 during a full rotation of the crank arm 10. For example, viewing the right side of the bike with the front wheel on the right, the crank arm 10 rotates clockwise from the bottom lowest point, called bottom dead center (BDC) or six (6) o'clock position, to the vertical apex, called top dead center (TDC) or 12 o'clock position, while the rider is pedaling the bike forward. During this half rotation of the crank arm 10, the pawl 50 locks the gear 40 through the plurality of pawl teeth 55 of the pawl 50 engaging the plurality of gear teeth 46 of the gear 40. Thus, the torsional spring—torque spring 70 is being twisted with the third arm 72 being stationary while the fourth arm 73 rotates with the foot pedal 90 around the axle 12 with respect to the gear 40. The torque spring coil 71 of the torque spring 70 is therefore stored with torsional energy. As the rider keeps pedaling and the crank arm 10 slightly passes the TDC, the torque spring 70 starts to release torsional energy when the crank arm 10 reaches one (1) o'clock position, where the fourth arm 73 of the torque spring 70 is stationary while the third arm 72 is rotating or unwinding with the gear 40 to transfer the released torque to the crank arm 10 through the nut 20. This released torsional energy significantly improves the rider's biking efficiency. Additionally, starting at the TDC, the rider is enabled to more efficiently pedal the bike due to the increased torque arm distance created by the locked foot pedal 90 as the pawl 50 locks the gear 40, comparing to the existing bikes without the present invention. As the foot pedal 90 is locked on the axle 12, the rider can generate additionally torque by applying force to the front edge of the foot pedal 90 at TDC, thus turning the TDC into a top dynamic center since the conventional "dead center" is referred to as a position that the rider would not create a torque by pushing down the foot pedal 90 due to the torque arm being zero.

Although the invention has been explained in relation to its preferred embodiment, it is to be understood that many other possible modifications and variations can be made without departing from the spirit and scope of the invention as hereinafter claimed.

What is claimed is:

1. A bike pedal assembly for maximizing and storing torque comprising:
   an axle;
   a nut;
   a gear;
   a pawl;
   a torque spring;
   a foot pedal;
   the axle being terminally connected to a crank arm of a bike;
   the nut being concentrically mounted to the axle adjacent the crank arm;
   the gear being concentrically and rotatably attached to the axle adjacent the nut;
   the pawl being perimetrically mounted to the nut adjacent the gear;
   the pawl being configured to unidirectionally lock the gear from rotating around the axle;
   the torque spring being concentrically positioned on the axle;
   the torque spring being terminally and perimetrically attached to the gear;
   the torque spring being attached to the foot pedal; and
   the foot pedal being rotatably and detachably attached to the axle.

2. The bike pedal assembly for maximizing and storing torque as claimed in claim 1 comprising:
   the axle comprising a first threaded end;
   the axle being mounted to the crank arm through the first threaded end;
   the nut comprising a center threaded hole; and
   the center threaded hole being concentrically connected to the first threaded end of the axle adjacent the crank arm.

3. The bike pedal assembly for maximizing and storing torque as claimed in claim 1 comprising:
   a locking spring;

a pin;

the gear comprising a bushing, a plurality of gear teeth, a rim hole, and a gear pin hole;

the bushing being concentrically and rotatably connected to the axle adjacent the nut;

the plurality of gear teeth being exteriorly distributed along the cylindrical surface of the gear;

the rim hole being positioned perpendicular to the cylindrical surface of the gear adjacent the plurality of gear teeth;

the gear pin hole being positioned outside and parallel with the bushing, opposite the nut;

the pawl comprising a loop, a loop pin hole, a pawl pin hole, a plurality of pawl teeth;

the loop being terminally positioned on the pawl;

the loop pin hole traversing the loop;

the pawl pin hole being positioned adjacent to and parallel with the loop pin hole;

the plurality of pawl teeth being distributed across the pawl, adjacent the loop;

the plurality of pawl teeth engaging and unidirectionally locking the plurality of gear teeth of the gear;

the locking spring being exteriorly and concentrically attached to the pin;

the locking spring being connected to the rim hole of the gear and the pawl pin hole of the pawl;

the nut comprising a plurality of radial holes;

the plurality of radial holes being distally distributed on the nut;

the pin being mounted on the nut through one of the plurality of radial holes; and the pin engaging the loop pin hole of the pawl.

4. The bike pedal assembly for maximizing and storing torque as claimed in claim 3 comprising:

the gear comprising a first rim and a second rim;

the first rim being positioned on the gear adjacent the nut;

the rim hole being positioned perpendicular to the cylindrical surface of the first rim;

the second rim being positioned on the gear opposite the first rim;

the gear pin hole being positioned on the second rim, parallel with and outside the bushing; and the plurality of gear teeth being oriented perpendicular to both the first rim and second rim.

5. The bike pedal assembly for maximizing and storing torque as claimed in claim 3 comprising:

the pawl comprising a first surface and a second surface;

the first surface being positioned on the pawl adjacent the nut;

the second surface being poisoned parallel with and opposite the first surface;

the loop pin hole being oriented perpendicular to the first surface and the second surface; and the pawl pin hole being positioned on the first surface adjacent the loop pin hole.

6. The bike pedal assembly for maximizing and storing torque as claimed in claim 3 comprising:

the pawl comprising an arc;

the arc traversing the exterior profile of the pawl;

the loop being terminally positioned on the arc; and the plurality of pawl teeth being distributed across the concave surface of the arc.

7. The bike pedal assembly for maximizing and storing torque as claimed in claim 3 comprising:

the locking spring comprising a locking spring coil, a first arm, and a second arm;

the first arm being terminally positioned on the locking spring coil;

the first arm being configured to engage the rim hole of the gear;

the second arm being terminally positioned on the locking spring coil opposite the first arm; and the second arm being configured to engage the pawl pin hole of the pawl.

8. The bike pedal assembly for maximizing and storing torque as claimed in claim 3 comprising:

the torque spring comprising a torque spring coil and a third arm;

the third arm being terminally positioned on the torque spring coil; and the third arm being configured to engage the gear pin hole of the gear.

9. The bike pedal assembly for maximizing and storing torque as claimed in claim 1 comprising:

the foot pedal comprising a bore, a coupling, and a chassis;

the bore being centrally and interiorly positioned on the chassis;

the coupling comprising a sleeve, a channel, and a coupling pin hole;

the sleeve being adapted to engage the bore of the foot pedal;

the channel being interiorly and concentrically positioned on the sleeve; and the coupling pin hole being interiorly positioned on the sleeve, opposite the pawl along the channel.

10. The bike pedal assembly for maximizing and storing torque as claimed in claim 9 comprising:

the axle comprising a second threaded end;

the second threaded end being terminally positioned on the axle opposite the first threaded end;

the axle being interiorly and concentrically connected to the channel of the coupling of the foot pedal;

the foot pedal comprising a pedal nut and a cap hole;

the cap hole being terminally positioned on the chassis of the foot pedal;

the cap hole being concentrically aligned with the channel of the coupling; and the pedal nut being concentrically and terminally connected to the second threaded end of the axle through the cap hole and against the chassis of the foot pedal.

11. The bike pedal assembly for maximizing and storing torque as claimed in claim 9 comprising:

the torque spring comprising a torque spring coil and a fourth arm;

the fourth arm being terminally positioned on the torque spring coil opposite the gear along the torque spring coil; and the fourth arm being configured to engage the coupling pin hole of the coupling.

12. The bike pedal assembly for maximizing and storing torque as claimed in claim 9 comprising:

the coupling of the foot pedal comprising an open end and a threaded open end;

the open end being terminally positioned on the coupling adjacent the gear;

the threaded open end being terminally positioned on the coupling opposite the open end;

the channel traversing between the open end and the threaded open end; and the coupling pin hole being interiorly positioned on the coupling adjacent the threaded open end.

* * * * *